*INVENTORS*
HARVEY E. ALBURN
NORMAN H. GRANT

*INVENTORS*
HARVEY E. ALBURN
NORMAN H. GRANT 3,455,784
CONTROL OF ENZYME ACTIVITY IN FROZEN SYSTEMS
Harvey E. Alburn, West Chester, and Norman H. Grant, Wynnewood, Pa., assignors to American Home Products Corporation, New York, N.Y., a corporation of Delaware
Filed Mar. 11, 1966, Ser. No. 533,705
Int. Cl. C12d *13/06, 9/06*
U.S. Cl. 195—29                          9 Claims

ABSTRACT OF THE DISCLOSURE

A method of enhancing enzymatic reactions of organic amino acid amide compounds, esters thereof, and penicillins, by conducting such reactions in frozen aqueous systems.

---

Figure 2:
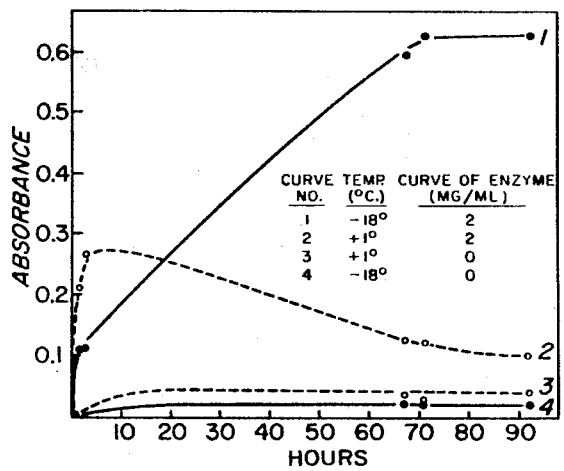

This invention relates to the control of enzymatic reactions by selection of novel reaction media. More particularly, the invention relates to the control of enzymatic reactions of organic chemicals by conducting such reactions in frozen aqueous solutions.

The possibility of performing organic chemical reactions in frozen aqueous solutions; i.e., in ice, has already been demonstrated and the potential advantages of such reactions has already been recognized. Thus, several studies have been published which indicate that chemical reactions, may, surprisingly, proceed much more rapidly in ice than in liquid water. For example, in the article, "Imidazole-and-Base-Catalyzed Hydrolysis of Penicillin in Frozen Systems," N. H. Grant, D. E. Clark and H. E. Alburn, J. Am. Chem. Soc., 82 (1961) 4476; it was demonstrated that the hydrolytic opening of the beta lactam ring of penicillin catalyzed by imidazole and histidine, proceeded at a more rapid rate in ice medium than in water. It was suggested by the authors that the exceptionally high proton mobility in ice might be the reason for the facilitation of fast proton transfer in either nucleophilic or general base catalysis of beta-lactam cleavage.

The similar phenomenon of increased rate of reaction in aqueous frozen systems was found with respect to the acid-catalyzed dehydration of 5-hydro-6-hydroxyuridine in ice, as reported by W. H. Prusoff in his article entitled "Low-Temperature Reversal of the Ultraviolet Photochemical Reaction Product of 2'-Deoxyuridine," Biochim. Biophys. Acta, 68 (1963) 302. The author concluded that the phenomenon could be of value in performing, by acid catalysis reactions of compounds which are unstable to the high acid strengths required in non-frozen systems. Thus, it was conjectured that reactions in the frozen state might be conducted at about $\frac{1}{1000}$ the acid concentration, in extrapolation of the theory that the ice-reaction medium has holes in which minute amounts of liquid water are present, thereby to provide highly concentrated solutions in each hole in the solid ice medium.

Following the foregoing teachings, A. R. Butler and T. C. Bruice attempted a quantitative comparison of reactions in ice and in water media, respectively, as reported in their two papers; namely, "Catalysis in Water and Ice.—A Comparison of the Kinetics of Hydrolysis of Acetic Anhydride, β-Propiolactone, and p-Nitrophenyl Acetate and the Dehydration of 5'-Hydro-6-Hydroxy-Deoxyuridine in Water and in Ice," J. Am. Chem. Soc., 86 (1964) 313; and "Catalysis in Water and Ice (II).— The Reaction of Thiolactones with Morpholine in Frozen Systems," J. Am. Chem. Soc., 86 (1964) 4104.

In none of the prior work in this art, exemplified by the foregoing, has there been any suggestion whatsoever that the activity of enzymes can be influenced beneficially by carrying out the enzyme reactions in other than the usual liquid reaction media. The reasons are simply that, from the knowledge in this art up to this time, it has naturally been expected that reaction rates decrease as diffusibility of the reactants decrease. Thus, although essentially nothing has been studied with respect to the action of enzymes in a rigid system, the formation and dissociation of enzyme-substrate complexes in such a system would be fully expected to be minimal, if not substantially completely absent. Moreover, little work has been done in attempting to change the specificity of enzymes.

In accordance with the present invention, it has now been found that, contrary to the conclusion to which those skilled in the art would be led by the prior work, observations and theories of operation of aqueous frozen chemical reaction media systems, and/or the conventional liquid media systems for enzymatic reactions; the activity of enzymes can, in fact, be influenced beneficially by carrying out the enzyme reactions in frozen aqueous reaction media. More specifically, we have found that, under the proper conditions, the catalytic activity of enzymes can be accelerated or inhibited, or the specificity of a given enzyme can be changed, if the compound (or compounds) to undergo enzymatic reaction is (are) dissolved in an aqueous medium together with the enzyme selected for the catalytic reaction, and the resulting solution is then frozen. The resulting solution, prior to freezing is required to be at a pH in the range of from about 2.0 to about 9.5. For such purpose, where necessary, appropriate adjustment of the pH may be made by addition of conventional basic or acid compound(s) or buffer compositions, in accordance with known procedures in the art. The frozen solution is then maintained in such condition, and the enzymatic reaction is then permitted to proceed. Thereafter, the products may be isolated from the frozen solution by known methods subsequently to melting of the reaction mixture. The term "frozen" as used herein has its customary meaning of denoting the characteristic of having the temperature lowered at least to the extent whereby the system under consideration is substantially rigid.

In accordance with the broad concept of the invention, the particular enzyme, which is selected for its requisite activity with respect to the compound(s) used in a given desired synthesis, is not critical to the contemplated exercising of the invention, and need have no other characteristic than that it be of the transfer type, which includes also all of the oxidative enzymes. Merely by way of example of transfer type enzymes generally, trypsin, chymotrypsin, ficin, bromelain, and the like, may be used. Other usable enzymes for causing the desired reaction with respect to the compound(s) selected for reaction, will suggest themselves to those skilled in this art.

The utility of the invention is based on the fact that enzymes are used commercially to carry out highly specific reactions, usually on labile compounds or mixtures. Any process in which better control of the enzyme activity can be achieved could be made more economical. Thus, the invention is applicable to the syntheses of a wide variety of compounds, such as alcohols, aldehydes, ketones, amines, amides, oximes, carboxylic acid, aromatic compounds, phenols, organo-metallic compounds, heterocyclic compounds, organic halogen compounds, and the like. Other classes of organic compounds, for the production of which the method of the invention is applicable, include carbohydrates, peptides, ribosides, ribonucleic acids, deoxyribonucleic acids, lipids, dehydrated compounds, drugs, antibiotics, and the like.

In employing the method of the invention, in addition to the general advantage of increased rate of reaction and other specific advantages referred to hereinbefore, there are also obtained the advantages of permitting the use of reaction conditions which are exceedingly mild, minimizing undesired side reactions, minimization of hydrolysis and attendant reversibility or reaction, and affording yields which are not attainable in liquid solutions.

The following examples illustrate uses of the method falling within the scope of the invention, which, however, as will appear to those skilled in the art, should not be considered limited thereby.

EXAMPLE I

Synthesis of L-lysine hydroxamic acid

Figure 1:
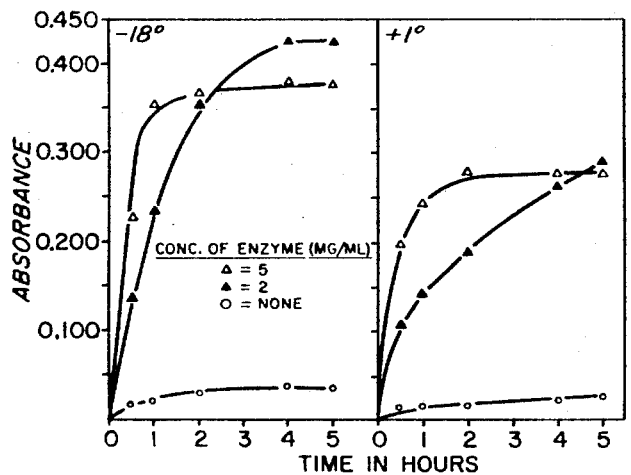

Solutions were prepared consisting of 0.005 M L-lysine ethyl ester, 0.4 M hydroxylamine (pH 7.5), and 2 mg. of trypsin per ml. Similar solutions were prepared with 5 mg. of trypsin per ml. In addition, solutions without trypsin were prepared as controls. Portions were frozen at $-18°$ and other portions were set at $+1°$. The extent of reaction was measured by absorbance of the hydroxamic acid-iron complex under acid conditions. FIGURE 1 of the drawings compares the rates at the $-18°$ and $+1°$ temperature levels for the hydroxylaminolysis of the L-lysine ethyl ester at the two concentrations of the trypsin. As appears from the graphs at both concentrations of trypsin, the rates at $-18°$ significantly exceeded those at $+1°$, in a period of 5 hours.

EXAMPLE II

Synthesis of benzoyl-L-arginine hydroxamic acid

Solutions were prepared consisting of 0.005 M benzoyl-L-arginine ethyl ester, 0.4 M hydroxylamine (pH 7.5), and 2 mg./ml. of trypsin. Other solutions were made of the same concentrations of the two reactants; i.e., the ester and the amine, but in this case without the inclusion of any trypsin. Portions of the two kinds of solutions; i.e. with and without enzyme, were frozen at $-18°$, and other portions of said two solutions were set at $+1°$. The extent of reaction in each case was measured by absorbance of the hydroxamic acid-iron complex under acid conditions. FIG. 2 of the accompanying drawings shows graphically that, in a period of about 70–90 hours, the enzymatic catalysis of the synthesis at $-18°$ was on a continuing increase, whereas that at $+1°$ was initially rapid, but reversed after about 5 hours. Without enzyme, the reactions were slow and quickly leveled off, with the reaction at $-18°$ never overtaking that at $+1°$.

EXAMPLE III

Synthesis of 6-aminopenicillanic acid

Solutions were prepared containing: (a) 1% penicillin V; (b) 1% freeze-dried ficin or bromelain as indicated in the table below; (c) 1% reduced sodium glutathione; (d) 0.1 M potassium phosphate buffer, pH 7.0. Controls were prepared with glutathione (with and without each of the enzymes) and with each of the penicillins. Each reaction mixture was stored at $22°$, $1°$, and $-18°$. After 4 days, these systems were analyzed by hydroxamate formation (measuring β-lactam stability), and by antimicrobial activity against *Staph. aureus* (measuring side chain and/or β-lactam hydrolysis). The table below gives the results. It is apparent that only the reaction at $-18°$ led to hydrolysis of the secondary amide without significant hydrolysis of the essential β-lactam.

TABLE

| Enzyme | Temp., °C. | Percent recovery | |
|---|---|---|---|
| | | β-Lactum | Biol. activity |
| Ficin | 22 | 16 | 0 |
| Do | 1 | 50 | 41 |
| Do | −18 | 98 | 80 |
| Bromelain | 22 | 26 | 0 |
| Do | 1 | 72 | 58 |
| Do | −18 | 94 | 73 |

EXAMPLE IV

Synthesis of L-tyrosine hydroxamic acid

Figure 3:
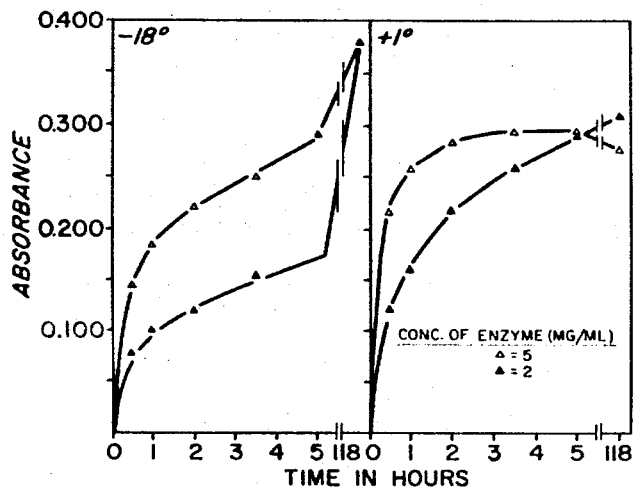

Following the procedure of Example II, L-tyrosine ethyl ester and chymotrypsin were substituted as substrate and enzyme, respectively. The rates for the chymotrypsin catalyzed hydroxylaminolysis of the L-tyrosine ethyl ester at the two enzyme concentrations of 2 and 5 mg./ml. were compared at $-18°$ and $+1°$, with the results shown graphically in FIG. 3 of the drawings. At both concentrations, the initial rates in the liquid systems at $+1°$ exceeded those in the frozen systems at $-18°$. However, in the period between 5 and 118 hours, the enzyme-catalyzed formations of hydroxamic acid leveled off or dropped slightly at $+1°$. Significantly, at $-18°$, the enzyme-catalyzed reactions consistently continued vigorously.

EXAMPLE V

Synthesis of L-glycine and L-arginine hydroxamic acids

Figure 4:
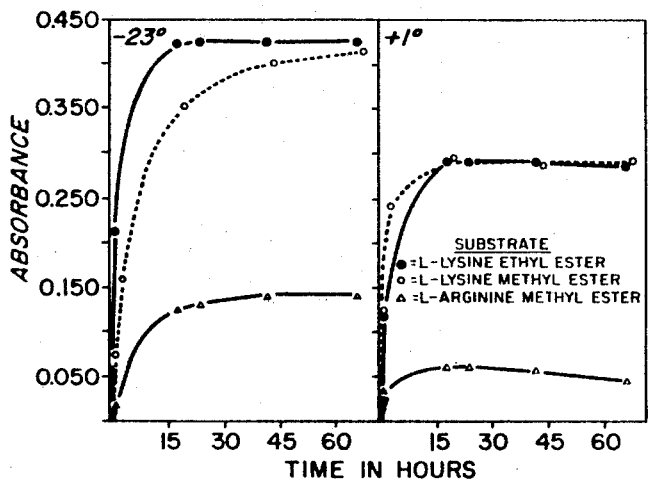

Again following the procedure of Example II, L-lysine ethyl ester, L-lysine methyl ester and L-arginine methyl ester, respectively, were utilized as substrates for a series of tryptic reactions, all at an enzyme concentration of 2 mg./ml. Half the runs were undertaken in frozen systems at $-23°$, and the remaining half in liquid systems at $+1°$. The comparative results of the experiments are shown graphically in FIG. 4 of the drawings. As appears therein, at $+1°$, the reactions proceeded initially as fast as, or faster than, at $-23°$, but they consistently leveled off at lower values. Moreover, a slight trend toward reversal appeared in each $+1°$ plot, but not at all in the $-23°$ plots.

We claim:

1. A method of causing the enzymatic reaction of one or more organic compounds which comprises dissolving: (1) an amine compound selected from the group consisting of basic amino acid amides, basic amino acid esters, aromatic amino acid amides, aromatic amino acid esters, and penicillins, (2) a nucleophilic compound capable of reacting with said selected compound, and (3) an enzyme selected from the group consisting of trypsin, chymotrypsin, ficin and bromelain, in an aqueous solvent at a pH in the range from about 2.0 to about 9.5 with the provisos that when the amine compound selected is of said basic amino acid category, the enzyme is always trypsin, and when the amine compound selected is of said aromatic amino acid category, the enzyme is always chymotrypsin; lowering the temperature of the reaction solution until the latter becomes frozen; maintaining said frozen system in a substantially rigidly frozen condition for a period of time to permit the enzymatic reaction to occur; and then recovering at least one compound formed by the enzymatic reaction in said frozen system.

2. A method as defined in claim 1 wherein said compounds are L-lysine ethyl ester and hydroxylamine, said enzyme is trypsin, and the recovered compound is L-lysine hydroxamic acid.

3. A method as defined in claim 2 wherein the aqueous solvent, in which are dissolved said L-lysine ethyl ester, said hydroxyl-amine and said trypsin, is adjusted to pH 7.5, prior to freezing.

4. A method as defined in claim 1 wherein said compounds are benzoyl-L-arginine ethyl ester and hydroxylamine, said enzyme is trypsin, and the recovered compound is benzoyl-L-arginine hydroxamic acid.

5. A method as defined in claim 4 wherein the aqueous solvent, in which are dissolved said benzoyl-L-arginine ethyl ester, said hydroxylamine and said trypsin, is adjusted to pH 7.5, prior to freezing.

6. A method as defined in claim 1 wherein said compound is penicillin and said enzyme is selected from the group consisting of ficin and bromelain, and the recovered compound is 6-aminopenicillanic acid.

7. A method as defined in claim 6 wherein the aqueous solvent, in which are dissolved said penicillin and said enzyme, is adjusted to pH 7.0 by addition of buffer, prior to freezing.

8. A method as defined in claim 1 wherein said compound(s) comprise an ester selected from the group consisting of L-tyrosine ethyl ester, L-lysine methyl ester, L-lysine ethyl ester and L-arginine methyl ester, and the amine hydroxylamine, the enzyme is selected from the group consisting of trypsin and chymotrypsin, and the recovered compound is the corresponding hydroxamic acid of the selected ester.

9. A method as defined in claim 8 wherein the aqueous solvent, in which are dissolved said ester, said amine, and said enzyme, is adjusted to pH 7.5, prior to freezing.

References Cited

Dixon et al.: Enzymes (1958), pp. 182–227.

LIONEL M. SHAPIRO, Primary Examiner

U.S. Cl. X.R.

195—30, 36, 68